United States Patent [19]
Weirich et al.

[11] Patent Number: 5,157,947
[45] Date of Patent: Oct. 27, 1992

[54] BALANCED HYDRAULIC VALVE DEVICES

[75] Inventors: Walter Weirich, Dortmund; Reiner Stich, Lünen; Michael Dettmers, Kamen, all of Fed. Rep. of Germany

[73] Assignee: Gewerkschaft Eisenhütte Westfalia GmbH, Fed. Rep. of Germany

[21] Appl. No.: 312,075

[22] Filed: Feb. 16, 1989

[30] Foreign Application Priority Data

Feb. 17, 1988 [DE] Fed. Rep. of Germany ....... 3804846

[51] Int. Cl.$^5$ .................... F16D 31/02; F16K 31/12; F16K 39/00
[52] U.S. Cl. ............................. 91/461; 91/170 MP; 137/494; 251/282
[58] Field of Search .................. 91/461, 420, 170 MP; 137/494; 251/282

[56] References Cited

U.S. PATENT DOCUMENTS

| | | | |
|---|---|---|---|
| 2,797,700 | 8/1953 | McGowen, Jr. | 137/494 |
| 3,133,475 | 5/1964 | Baikan | 91/461 X |
| 3,207,178 | 9/1965 | Nevulis et al. | 91/420 X |
| 3,524,386 | 8/1970 | Cudnohufsky | 91/461 |
| 3,943,968 | 3/1976 | Treichler | 91/420 X |
| 4,074,695 | 2/1978 | Weirich et al. | 137/508 |
| 4,172,582 | 10/1979 | Bobnar | 251/282 X |
| 4,292,990 | 10/1981 | Pareja | 137/115 |
| 4,313,463 | 2/1982 | Weirich | 137/494 X |
| 4,341,370 | 7/1982 | Banks | 251/282 |
| 4,936,714 | 6/1990 | Demircan | 137/494 X |

FOREIGN PATENT DOCUMENTS

| | | |
|---|---|---|
| 099134 | 1/1984 | European Pat. Off. |
| 525541 | 8/1940 | United Kingdom |
| 546350 | 7/1942 | United Kingdom |
| 2163237 | 2/1986 | United Kingdom |

Primary Examiner—Edward K. Look
Assistant Examiner—John Ryznic
Attorney, Agent, or Firm—Samuels, Gauthier & Stevens

[57] ABSTRACT

A valve device takes the form of a multi-part cartridge with a hollow stepped housing containing a stepped rod. A control piston at one end of the rod is opposed by the force of a main spring in a main chamber remote from the control piston. A valve closure member is axially displaceable relative to the rod. The valve closure member is normally held against a valve seating but pressure on the control piston displaces the rod and causes the valve closure member to be lifted from its seating via stop faces. An auxiliary chamber in the housing leads via a connection to some consumer appliance and forms, the downstream side of the valve. A compensating piston on the rod member opposes a face of the valve closure member open to the auxiliary chamber. A further spring in the auxiliary chamber holds the valve closure member on its seating. The valve can open independently of the control piston should the pressure on the upstream side of the valve exceed the consumer pressure. This upstream side usually leads to either the pressure line or a return line as determined for example, by a change-over valve. The valve closure member will respond reliably to increased pressure on the control piston which only has to overcome predetermined spring force independent of hydraulic pressure in the auxiliary chamber.

3 Claims, 1 Drawing Sheet

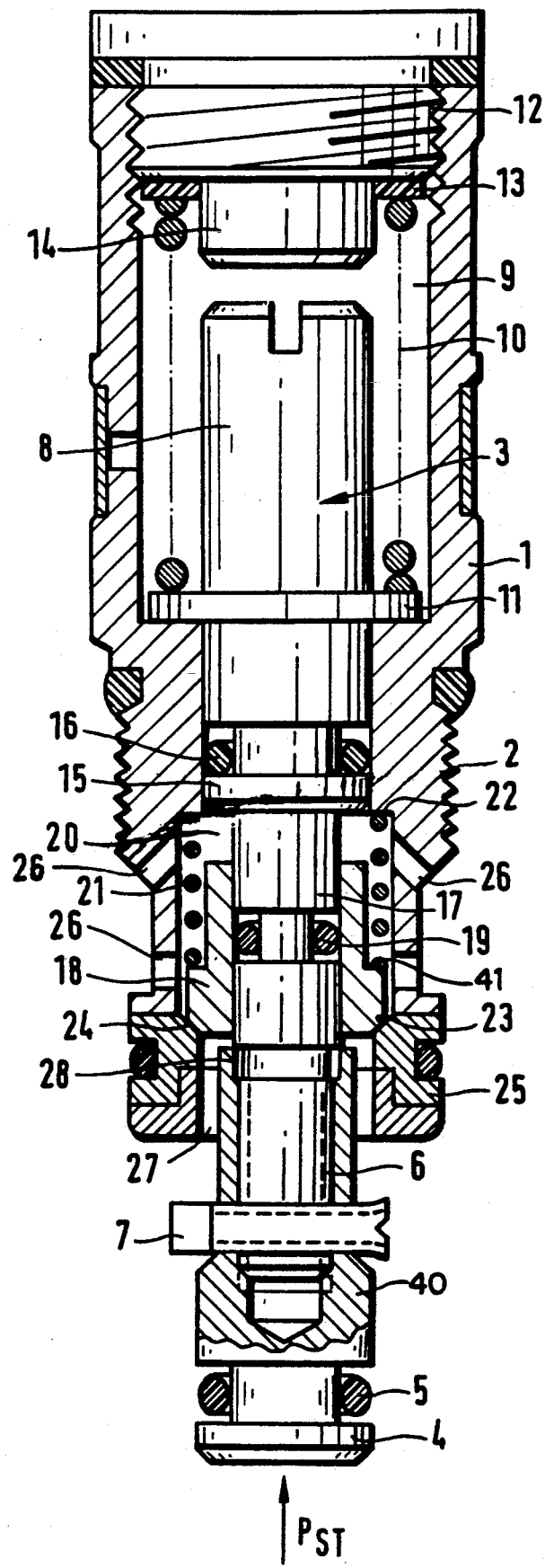

BALANCED HYDRAULIC VALVE DEVICES

FIELD OF THE INVENTION

The present invention relates in general to hydraulic valve devices for use with mining equipment and more particularly to a non-return valve device which is opened by hydraulic pressure.

BACKGROUND TO THE INVENTION

Hydraulically openable non-return valves are widely used in the hydraulic control of roof supports and other equipment in a mineral mining installation. Such a known device has a control piston which moves a valve stem against the restoring force of a spring to lift a valve closure member from a seating. With the valve opened a consumer line, leading for example to a prop working chamber, makes connection with a pressure line or a return line via a chamber in the device. When the valve is closed the hydraulic pressure in a chamber of the device, i.e. the consumer pressure, acts on the closure member so that the closure force of the spring is supplemented by this hydraulic pressure. As a result a high control pressure needs to be applied to the control piston to cause the valve to respond and open. The change over or switching control pressure necessary to open the valve is dependent on the prevailing pressure in the consumer line which can undergo considerable fluctuation. Thus the pressure needed to cause the valve to open is imprecise and can lead to erroneous change-over and malfunctioning of the equipment.

A general object of the present invention is to provide an improved valve device of the above-mentioned kind in which a more reliable operation even under wide variation in consumer pressure can be ensured.

SUMMARY OF THE INVENTION

A valve device constructed in accordance with the invention employs a valve closure member which is subjected to the action of a spring to bias the closure member against a valve seating (collectively forming a valve) and to block communication between first and second connections leading to the respective sides of the valve. A control piston when exposed to control pressure is capable of moving the closure member off the seating against the spring force. The closure member lies in an interior chamber which leads via the associated first connection to a consumer appliance. The second connection leads to a pressure line or a return line.

In accordance with the invention, the valve closure member takes the form of a sleeve and the control piston is linked via a rod member passing through the sleeve to the spring. A stop face on the rod member can engage on the valve sleeve when the control piston is displaced by pressure thence to displace the sleeve. A pressure compensating piston is provided on the rod member to confront a flange of the sleeve. The working faces of this piston and the flange are exposed to pressure in the chamber and are subjected to the consumer pressure. These working faces are dimensioned to counterbalance the resultant forces when the valve is closed. This means that the force which has to be applied to the control piston is always independent of the pressure prevailing in the consumer pressure connection and in the chamber. Preferably, the valve sleeve, i.e. the closure member, is also subjected to the force of a weak auxiliary spring. This permits the valve sleeve to be raised off its seating independently of any action of the control piston and to move relative to the rod member should the pressure in the pressure line connected to the second connection be greater than the consumer pressure. Should the valve be opened as a result of pressure on the control piston the valve sleeve is controlled quite independently of any pressure difference on the two sides of the valve.

In a preferred construction, the present invention provides a hydraulically controlled valve device for use with mining equipment; said valve device comprising a housing, a valve seating, a valve closure member contained in the housing, the valve closure member and the valve seating having inter-engageable valve surfaces which provide a valve, a first chamber in the housing, a spring in the first chamber, a rod member guided for movement in the housing and subjected to the force of the spring tending to maintain the valve closed, a control piston on the rod member which is subjected to hydraulic control pressure to oppose the action of the main spring and to open the valve, a further chamber in the housing which communicates with the valve, connection means for establishing connection between the further chamber and a consumer appliance controlled by the device, at least one working face on the valve closure member exposed to the further chamber and a pressure compensation piston provided on the rod member and having a working face exposed to the further chamber, wherein the working face of the valve closure member and the working face of the pressure compensation piston provide forces which substantially counterbalance when the valve is closed.

The invention may be understood more readily, and various other aspects and features of the invention may become apparent, from consideration of the following description.

BRIEF DESCRIPTION OF DRAWINGS

An embodiment of the invention will now be described, by way of example only, with reference to the accompanying drawing which is an axial sectional elevation of a valve device constructed in accordance with the invention.

DESCRIPTION OF PREFERRED EMBODIMENT

As shown in the drawing a valve device constructed in accordance with the invention takes the form of a cartridge with a main body in the form of a hollow housing 1. The housing 1 has an external screw thread 2 which enables the device to be fitted into a screw-threaded bore of some associated unit such as a valve block. The housing 1 has a internal stepped bore which receives a stem or rod member 3 which has a correspondingly stepped peripheral surface. The lower end of the housing 1 is open and the rod member 3 projects outwardly from this end of the housing 1 into the associated unit. The opposite upper end of the housing 1 is closed with a plug 14 which is screwed to the housing as indicated by reference 12, and engages on a seal or packing on the end face of the housing. The rod member 3 is of multi-part construction and a piston 4 is formed at one end of a sleeve 40 which has a threaded bore 6 which is in screw-threaded engagement with the lower end portion of the main component of the rod member 3. A pin 7 engages in transverse bores in the components 40,3 to lock these components together. A piston sealing ring 5 is provided behind the piston 4.

The upper region 8 of the rod member 3 has the greatest diameter and lies in a main or first chamber 9 in the housing 1. A compression spring 10 is located in the chamber 9 and engages on a flange 11 of the member 3 and on the inner face of the plug 14 via a packing ring 13. The spring 10 biases the flange 11 against a shoulder in the housing 1 but steadily increased control pressure $P_{st}$ on the piston 4 will raise the rod member 3 to compress the spring 10 until the upper end of the rod member 3 abuts on a depending spigot of the plug 14.

A valve is established between frusto-conical mating surfaces 23,24 of a valve seating 25, conveniently separately formed and fitted to the housing 1, and a valve closure member or sleeve 18 guided for axial movement on a portion 17 of the rod member 3.

The valve surface 24 is provided on a flange 41 of the valve closure member 18. Annular end faces of a sleeve portion of the member 18 and of the flange 41 are open to a further chamber 20 in the housing 1. The rod member 3 has an intermediate pressure compensating piston 15 which opens to the chamber 20. The piston 15 has the same effective working area as the faces of the closure member 18. The piston 15 also has the same diameter as the region 8 of the rod member 3 and fits with part of the region 8 in a bore portion of the housing 1. A piston sealing ring 16 is provided behind the piston 15. The further chamber 20 is of larger diameter than the piston 15. The portion 17 of the rod member 3 is smaller in diameter than the pistons 4,15 and has a groove which receives an O-ring 19 to seal the rod member 3 from the interior of the sleeve 18. An auxiliary spring 21 with a force weaker than the spring 10 is located in the further chamber 20 and engages on a shoulder 22 in the housing 1 and the flange 41 of the sleeve 18. The upper end of the sleeve 40 is spaced from the flange 41 of the sleeve 18 when the valve is closed but forms an abutment or stop face 28 which engages the sleeve 18 to displace the latter. The spring 21 holds the valve surfaces 23,24 directly together. The further chamber 20 located on one side of the valve 23,24, i.e. the downstream side, opens via a connection provided by ports or bores 26 in the housing 1 and an annular gap provides a connection 27 on the other side of the valve i.e. the upstream side.

During use, the valve device is screwed into the associated unit which selectively exposes the piston 4 to control pressure $P_{st}$. The connection 27 leads selectively to either a pressure line or a return line of a hydraulic system, say via a change over valve. The connection 26 leads via a consumer line to some associated consumer appliance which is to be controlled by the valve device which connects the pressure line or return line to the consumer appliance in response to the control pressure $P_{st}$. The further chamber 20 is linked via the connection 26 to the consumer appliance and is subjected to the prevailing consumer pressure for example in one or more chambers of hydraulic roof support props. The pressure in the further chamber 20 acts on the working face of the piston 15 and on the annular working faces of the sleeve 18. The resultant forces act in opposite directions but the areas of the faces exposed to pressure are dimensioned so that pressure compensation occurs at the sleeve 18 and the closure force on the valve surfaces 23,24 is substantially only dependent on the force of the spring 21. The pressure $P_{st}$ at which the valve responds is independent of the loading on the consumer connection 26 and the pressure in the further chamber 20 and hence the opening of the valve is thus dependent on the relationship between the closing force of the springs 10,21 and the pressure $P_{st}$. If the pressure $P_{st}$ rises beyond a predetermined value to overcome the closing force of the spring 10 the piston 4 raises the rod member 3 until the sleeve 40 engages with the flange 41 and lifts the closure member 18 against the restoring force of the spring 21. The valve 23,24 is opened to establish communication between the connections 26, 27. As the pressure $P_{st}$, falls, the spring 10 returns the member 3, the flange 41 is released and the valve is closed again by the spring 21. Apart from the response to the pressure $P_{st}$, should the pressure at the connection 27 become significantly greater than the connection 26 then the closure member 18 will be raised automatically against the force of the spring 21 to establish communication between the connections 26,27 until the pressure imbalance is restored. The valve will then close again under the force of the spring 21.

We claim:

1. A hydraulically controlled valve device for use with mining equipment; said valve device comprising a housing, a valve seating, a valve closure member contained in the housing, the valve closure member and the valve seating having inter-engageable valve surfaces which provide a valve, a first chamber in the housing, a spring in the first chamber, a rod member guided for movement in the housing and subjected to the force of the spring tending to maintain the valve closed, the rod member being a stepped multi-part component and the housing having a stepped bore into which the rod member extends, a control piston on the rod member which is subjected to hydraulic control pressure to oppose the action of the main spring and to open the valve, the control piston being provided on a component of the rod member which is detachably and adjustably connected to the remainder of the rod member, a further chamber in the housing which communicates with the valve, connection means for establishing connection between the further chamber and a consumer appliance controlled by the device, at least one working face on the valve closure member exposed to the further chamber and a pressure compensation piston provided on the rod member and having a working face exposed to the further chamber, wherein the working face of the pressure compensation piston provide forces which substantially counterbalance when the valve is closed.

2. A device according to claim 1, wherein the valve closure member is a sleeve which is guided on the rod member and an auxiliary spring is provided in the further chamber, the auxiliary spring engaging on one end of the further chamber and on the valve closure member to hold the valve closed.

3. A device according to claim 1, wherein the rod member has a stop face which engages with the valve closure member when the rod member is displaced by pressure on the control piston to move the valve closure member and open the valve.

* * * * *